USOO5946345A

United States Patent [19]
Karlsson et al.

[11] Patent Number: 5,946,345
[45] Date of Patent: Aug. 31, 1999

[54] APPARATUS AND A METHOD FOR TELECOMMUNICATION SYSTEM

[75] Inventors: Jonas Karlsson, Kista; Paul Teder, Täby; Lars-Magnus Ewerbring, Stockholm, all of Sweden

[73] Assignee: Telefonktiebolaget LM Ericsson, Stockholm, Sweden

[21] Appl. No.: 08/911,399

[22] Filed: Aug. 14, 1997

[30] Foreign Application Priority Data

Aug. 16, 1996 [SE] Sweden .................................. 9602999

[51] Int. Cl.[6] ...................................................... H04B 1/69
[52] U.S. Cl. ............................................................ 375/210
[58] Field of Search .................... 375/200, 210, 375/205

[56] References Cited

U.S. PATENT DOCUMENTS 5,371,760  12/1994  Allen et al. .............................. 375/200
5,717,403   2/1998  Nelson et al. ........................... 342/357

FOREIGN PATENT DOCUMENTS

WO 95/22208  8/1995  WIPO .
WO 96/06487  2/1996  WIPO .

OTHER PUBLICATIONS

S.S.H. Wijayasuriya, et al., "Sliding Window Decorrelating Algorithm for DS–CDMA Receivers", Electronic Letters, vol. 28, No. 17, Aug. 1992, pp. 1596–1598.

S.S.H. Wijayasuriya, et al., "RAKE Decorrelation as an Alternative to Rapid Power Control in DS–CDMA Mobile Radio", Proceedings 43rd Vehicular Technical Conference, New Jersey, 1993, pp. 368–371.

S.S.H. Wijayasuriya, et al. "A Near–Far Resistant Algorithm to Combat Effects of Fast Fading in Multi–User DS–CDMA Systems", Proceedings 3rd IEEE International Symposium on Personal, Indoor and Mobile Radio Communication, Boston, Oct. 1992, pp. 645–649.

John G. Proakis, Digital Communications, McGraw–Hill, Inc., 1995, pp. 802–804.

*Primary Examiner*—Stephen Chin
*Assistant Examiner*—Lenny Jiang
*Attorney, Agent, or Firm*—Burns, Doane, Swecker & Mathis, L.L.P.

[57] ABSTRACT

A receiver device (703) downspreads signals from a band spreading signal, which generates downspread symbol sequences (803). A vector generator (704) generate symbol vectors (805) which include a symbol from each downspread symbol sequence (803). An auxiliary receiver (705) detects symbol vectors (805) in a first window (809) with the length of one symbol time. The auxiliary receiver (705) generates provisional estimates of the symbol vectors (805) with the help of a device with a first window algorithm (811). A delaying module (706) delays the symbol vectors (805) from the vector generator (704) by one symbol time before they reach a main receiver (707). The main receiver (707) detects in a second window (806) the symbol vectors (805) with the length of one symbol time. The main receiver (707) uses a device with a second window algorithm (808) in order to estimate the received symbol vectors (805) with reference taken to the previously estimated symbol vectors in the main receiver (705) and the provisional estimates of the symbol vectors (805) from the auxiliary receiver (705). A component generator (710) divides up the estimated symbol vectors (807) from the main receiver into separate components (815).

22 Claims, 13 Drawing Sheets

APPARATUS AND A METHOD FOR TELECOMMUNICATION SYSTEM

TECHNICAL FIELD

The present invention relates to reception of radio signals which are transmitted by means of band spreading techniques in a common frequency band in a radiocommunication system.

STATE OF THE ART

A method which is used for transmitting information from a number of simultaneous users on a common frequency band is called a multiple access method. The most common forms of multiple access are based on frequency multiplexing, FDMA (Frequency Division Multiple Access) and time multiplexing, TDMA (Time Division Multiple Access).

In FDMA the available (or bandwidth) is divided up into a number of narrow frequency bands. A user in the system is allocated an empty frequency band for its exchange of information.

In TDMA the available band width is divided up into a number of narrow frequency bands with a number of time slots in each frequency band. The time slots are repeated normally periodically and correspond to the narrow frequency band in FDMA. This considerably increases the capacity for a system with a given band width compared with FDMA.

An alternative to TDMA is a group of multiplex techniques which are called code multiplexitig, CDMA (Code Division Multiple Access). These multiple techniques are also called band spreading techniques. CDMA means that a number of simultaneous connections can use a common frequency band. CDMA, like TDMA, is suitable for digital techniques. A variant of CDMA is the direct sequence technique, DS-CDMA. DS-CDMA means that each user marks his connection with the help of a unique code, also called the spreading sequence, which is independent of the information which is to be sent. That the transmitter marks his signals with a spreading sequence before they are transmitted is called upspreading of the signals. The spreading sequences have a much larger band width than the information of the user whereby the signal is spread out over a large frequency band of the spreading sequence. Several simultaneous users in the system use the same frequency band whereby the information from these users is superimposed on each other. In a receiver the received signals are spread down with a copy of the user's spreading sequence which means that the original signal can be reconstituted. The down spreading can also be performed with the help of a signal adapted filter. DS-CDMA techniques use the available frequency space in an effective way.

A large problem with DS-CDMA techniques is that a strong signal can drown other weaker signals from more distant or hidden users in the system. This is usually called the near-far problem. A solution to this problem has been to introduce power regulation into the system. These regulation systems are very complicated and expensive. The regulation system must be extremely fast at regulating for variations in the energy levels of the signals.

A method of minimizing the requirement for advanced power regulation in CDMA systems is treated in several articles of S. S. H. Wijayasuriya, J. P. McGeehan and G. H. Norton. A first article is "Sliding Window Decorrelating Algorithm for DS-CDMA Receivers", pages 1596–1598, in Electronic Letters, volume 28, number 17, from Aug. 13, 1992. A second article is "RAKE Decorrelation as an Alternative to Rapid Power Control in DS-CDMA Mobile Radio", pages 368–371, from Proceedings 43rd Vehicular Technical Conference in New Jersey, 1993 and a third article is "A Near-Far Resistant Algorithm to Combat Effects of Fast Fading in Multi-User DS-CDMA Systems", pages 645–649 from Proceedings 3rd IEEE International Symposium Personal, Indoor and Mobile Radio Communication in Boston in October 1992.

By using a sliding window algorithm, called SLWA, the signals can be detected without extensive power regulation. The so-called window is a time interval in which the received signal is detected. SLWA detects a number of symbols, from the different users, which comprise at least one bit per symbol, from the down spread incoming signals. The time window which holds a number of symbols is moved over the signals one bit, or one symbol, at a time. An extensive calculation process corrects the bits/symbols in the window before a final estimation and detection of the received symbols is performed. The algorithm uses a preceding estimate of a bit/symbol and calculated expected estimate of a coming bit/symbol in order to adjust for edge effects, that is to say errors which occur at the beginning and at the end of the window. The calculated expected estimate of a coming bit/symbol is found via a probability calculation. By using a convolution code with half the working cycle time (½ rate convolutional code), and knowledge about the double number of bits of the last of the bits detected in sequence minus one (2×constraint length −1), an expected estimate of the next bit/symbol in the window can be calculated. Said method presupposes that the last received bits are correctly detected. By choosing a large window length in SLWA the effect of the edge effects on the detection of the signals is reduced. This also facilitates the introduction of so called interleaving into the system. A large window, however, entails a large number of calculation processes as each new bit/symbol which falls in the window generates a new calculation process for all bit/symbols in the window. This means that a new calculation process overlaps the proceeding calculation process so closely as to one bit/symbol.

A patent from MOTOROLA INC. WO 95/22208 describes a device for receiving DS-CDMA signals without using power regulating. The device uses pilot symbols with known polarities which at equal intervals are put into the signals of the transmitter. Modulation with pilot symbols is called PSAM (Pilot Symbol Assisted Modulation). The received signals pass through a signal adapted filter in which the signals are spread down in order to be then stored in a memory. A predetermined part of each received signal forms a vector in a window. The receiver forms an inverse cross correlation matrix of the known used spreading sequences and time delays between the received signals. The receiver also calculates an estimate of the energy level before and after the window with the help of the known pilot symbols and a preceding estimate of the content in a received window. Said pilot symbols are sent in such a way that they frame the window. The energy estimate is multiplied with a part of the cross correlation matrix in order to then be subtracted from a vector in the memory. This removes interference from the symbols outside the window and forms a new vector. The device multiplies the new vector with the cross correlation matrix which forms a last vector. This last vector is detected in a detector in the device. As mentioned earlier the receiver requires that a modulation with the pilot symbols is provided in the system.

DISCLOSURE OF THE INVENTION

The present invention tackles said near-far problem which occurs during radio transmissions with a band spreading technique. Defined more closely the problem occurs in the case one or more signals in a common frequency band has a more powerful signal level than the other signals which are to be received, whereby the other signals risk being drowned by the more powerful signal.

The object with the present invention is consequently, with a minimal energy loss, to detect the received signals and increase the possibility of correct detection of a signal which has a lower signal level than some stronger signal. This permits the introduction of simple power controlling algorithms and that the capacity of the system can be increased.

The invention provides a method and a device for solving said problem. A predetermined time sector of the received signal is estimated and edge effects at the beginning and end of the time sector are eliminated. This takes place through comparing a part of the beginning of the received signal with a corresponding part which is detected in a preceding time sector. An estimate of the signal in a coming time sector is compared with the finish of the just received signal.

More concretely, the solution is a method and a device with an auxiliary receiver and a main receiver. In the auxiliary receiver a preliminary estimate of a predetermined time sector of the signal is generated.

In the main receiver a final estimate of the signal in the main receiver's time sector is generated. Here account is taken of on the one hand a preceding final estimate of the signal in an earlier time sector in the main receiver, on the other hand the preliminary estimate of the signal for the predetermined time sector from the auxiliary receiver, which precedes the time sector which the main receiver detects. The invention also takes account of the condition of the channel, the spreading sequences used for the received signals, which symbols are used and the time delay between the different received signals.

The advantage with the following invention is that the invention is not sensitive to interference from nearby users or systems without requiring extra coding or symbols to be introduced into the signaling. The need for complicated power regulation algorithms is reduced. The signal processing in the invention can be performed in such a way that energy losses are reduced compared with known methods. This means that the capacity in the system can be increased or that the quality of the detected signals improved. The invention can be applied to both up and down links in radio connections. The invention can be used in different types of receivers.

The invention will now be described more closely with the help of preferred embodiments and with reference to the accompanying drawings.

PREFERRED EMBODIMENTS

Figure 1:
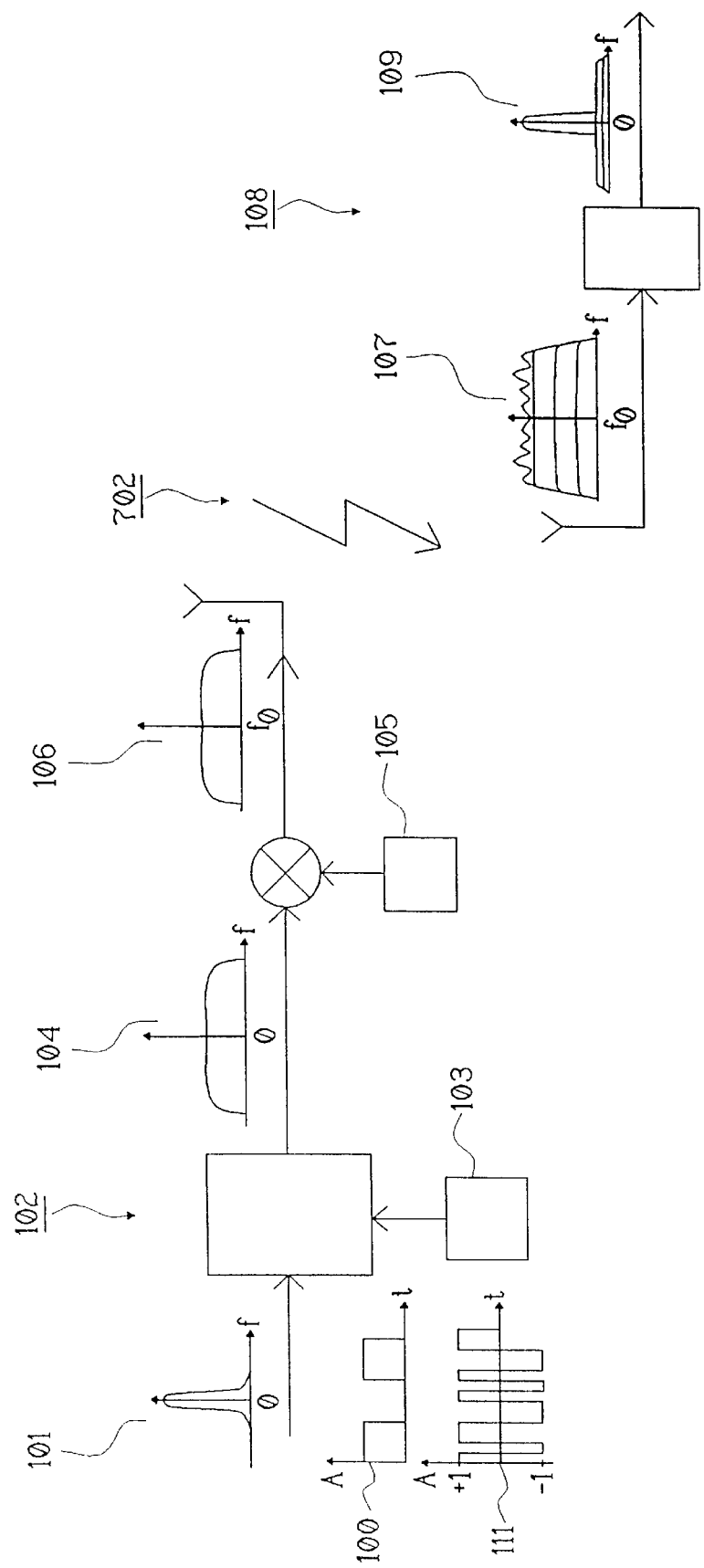
FIG. 1 shows a view of a simple DS-CDMA system.

A known technique for transmitting superimposed radio signals on a common channel for the signals in a radio system is the so-called direct sequence band spreading techniques, also known as DS-CDMA technique (Direct Sequence Code Division Multiple Access). The expression channel means the physical transmission medium between the transmitter and receiver and also transmitter and receiver filters. FIG. 1 shows schematically a transmitter 102 and a receiver 108 with the signal diagram 100, 101, 104, 106 107, 109 and 111. These diagrams show amongst others, a data sequence 100 and the narrow band spectrum 101 and a spreading sequence 111. In the diagram time is referenced with t, frequency with f and amplitude with A. The spreading sequence 111 has a significantly larger band width than the data sequence 100. DS-CDMA means that the narrow band data sequences 100 and 101 from a user of the transmitter 102 is multiplied by the extremely wideband spreading sequence 111, also called the PN-code (Pseudo Noise Code) which is generated by a spreading sequence generator 103. This is called upspreading or coding of the data sequence, which means that the information in the sequence 100 is spread over a large frequency range. A resulting wide band signal 104 is mixed in turn with a carrier wave with a central frequency fo from a transmitter oscillator 105 to form a transmitted signal 106. The transmitter oscillator can also, according to an alternative, be directly modulated by the spreading sequence 111. Several users of the radio system transmit on the same frequency band which means that a number of signals are mixed with each other to form a signal 107. Each user who transmits a signal uses his own unique spreading sequence corresponding to the sequence 111. The length of these spreading sequences can vary between different systems and users. In a receiver 108, which receives the signal 107, a copy of the spreading sequence 111 is used in order to spread down the signal. The superimposed wide band signals 107 here are made into a narrow band data sequence and a little noise 109. The sequence 109 herewith corresponds to the original transmitted data sequences 100 and 101.

In order that the receiver 108 shall be able to separate the different signals which are transmitted on the common channel, unique spreading sequences 111 are used as mentioned earlier. If the different spread-up signals during receiving, represented in vector form, are orthogonal, that is to say the vectors have an angle of 90° between each other, then the vectors are independent of each other. The downspread data sequences in this case only contain data from the respective user. It is, however, normal that different characteristics in the channels mean that the vectors become non-orthogonal. In the uplink, between the mobile and base stations, the time points for the transmissions from the mobiles are often not synchronized which leads to that it is not worth using completely orthogonal spreading sequences. This means that the vectors become dependent, which leads to the downspread data sequences being influenced by each other's signals. There are only a limited number of spreading sequences 111 which are completely orthogonal with each other. The number of orthogonal spreading sequences increases with the length of them. A measurement of how orthogonal two vectors are is given by cross correlation. A small cross correlation means that the vectors are nearly orthogonal.

Figure 2:
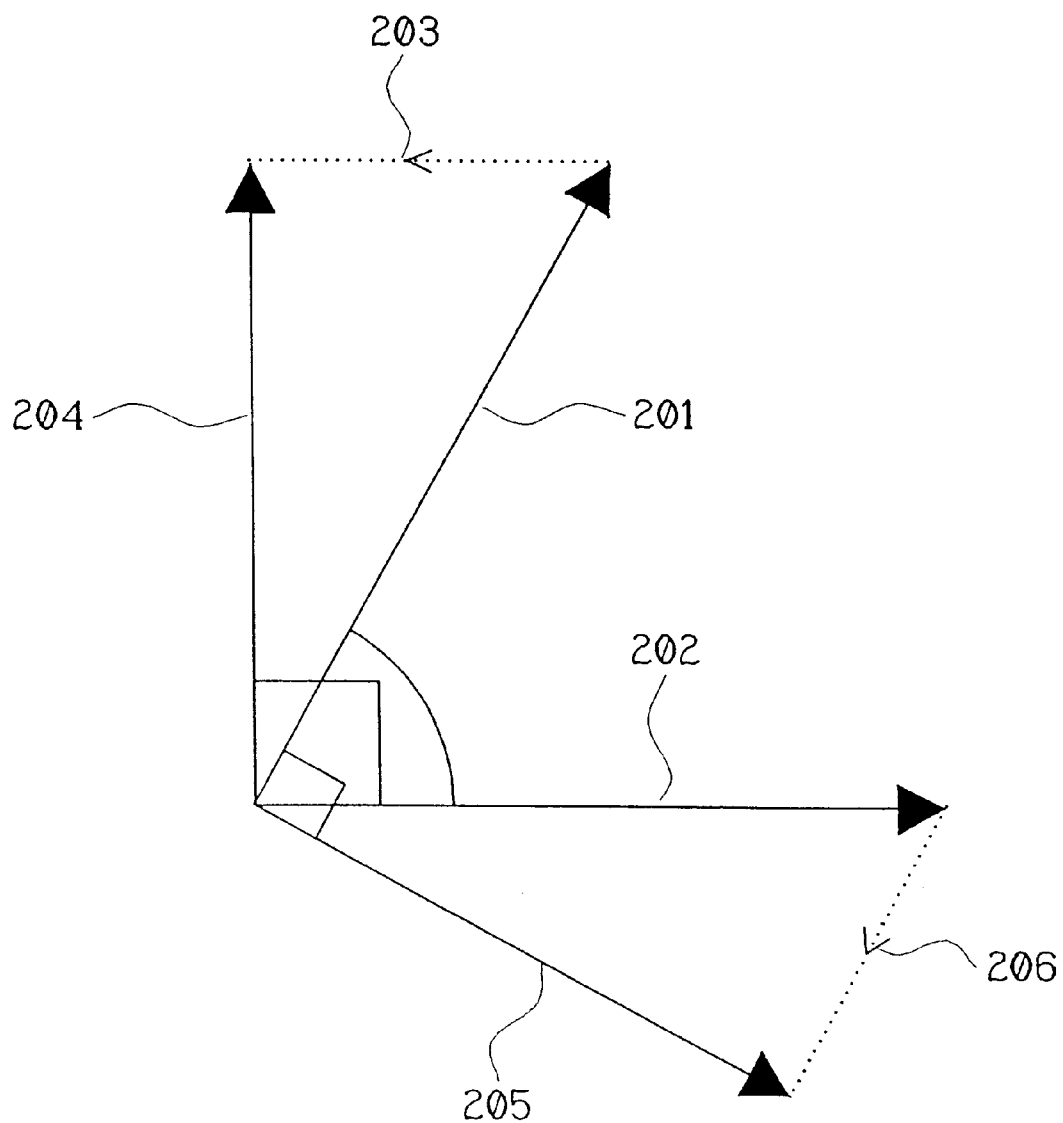
FIG. 2 shows a view of a vector diagram.

When, for example, a so-called joint detection receiver receives two non-completely orthogonal vectors 201 and 202 with a large cross correlation, see FIG. 2, then according to a known method the joint detection receiver projects one of the vectors 201 so that it forms an orthogonal vector 204 to the other vector 202 before the signal 201 is detected. This means that the signal energy, the length of the vector, is reduced in the new vector 204 compared with the original vector 201. The vector 202 is projected 206 in the same way-as vector 201 so that it forms a vector 205 orthogonal with the vector 201. The example shows vectors in two dimensions while vectors which represent DS-CDMA signals usually have many more dimensions than those which are shown in FIG. 2.

Figure 3:
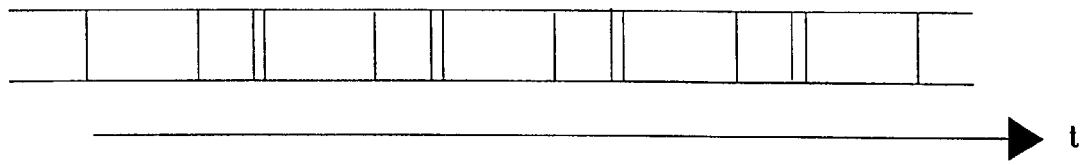
FIG. 3 shows a view of a DS-CDMA signal received before a downspreading.
Figure 4:
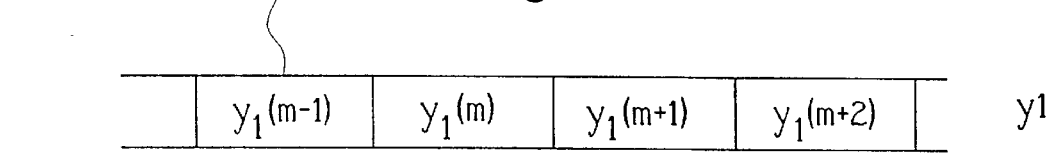
FIG. 4 shows a view of three DS-CDMA signals received after a downspreading.
Figure 5:
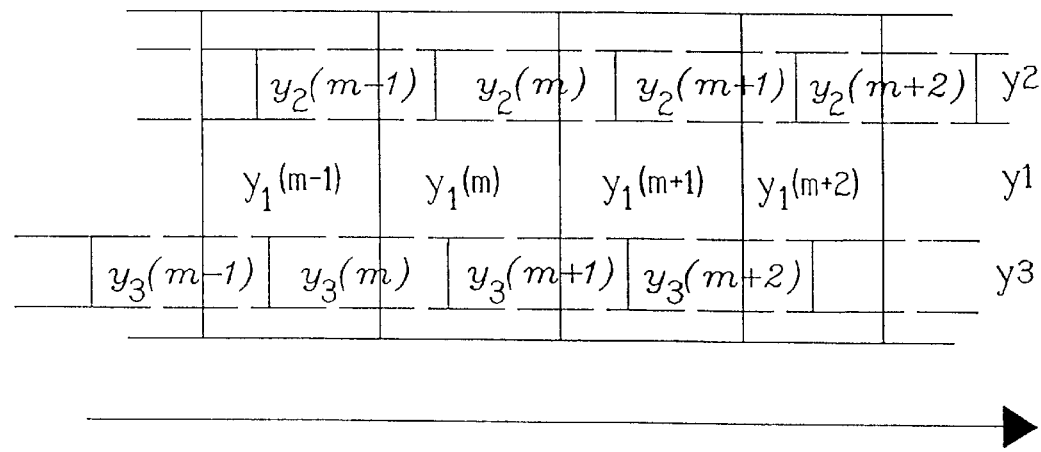
FIG. 5 shows a more detailed view of one of three DS-CDMA signals received after downspreading.

As mentioned earlier, in the DS-CDMA technique several signals are sent on the same frequency band. FIG. 3 shows an example with three DS-CDMA signals from three different users which are received by the receiver 108. They are superimposed on the same frequency band but are time shifted in relationship to each other. FIG. 4 shows the three signals after downspreading whereby they are separated into three different symbol sequences $y_1$, $y_2$ and $y_3$ comprising a sequence of symbols 401 which are sent at discrete time points. Each symbol occupies a symbol time $t_s$. The letter m is a time index for the symbols, wherein the time index is increased by integer numbers. If the three spreading sequences $y_1$, $y_2$ and $y_3$ are not orthogonal, see FIG. 2, with each other then each separate symbol sequence $y_1$, $y_2$ and $y_3$ comprise the non-orthogonal parts of each other's symbol sequences. FIG. 5 shows the symbol sequence $y_1$ and the non-orthogonal to $y_1$ parts of the symbol sequences $y_2$ and $y_3$, respectively. The non-orthogonal parts of $y_2$ and $y_3$ which overlap $y_1$ interfere with the subsequent detection of the symbol sequence $y_1$.

Figure 6:
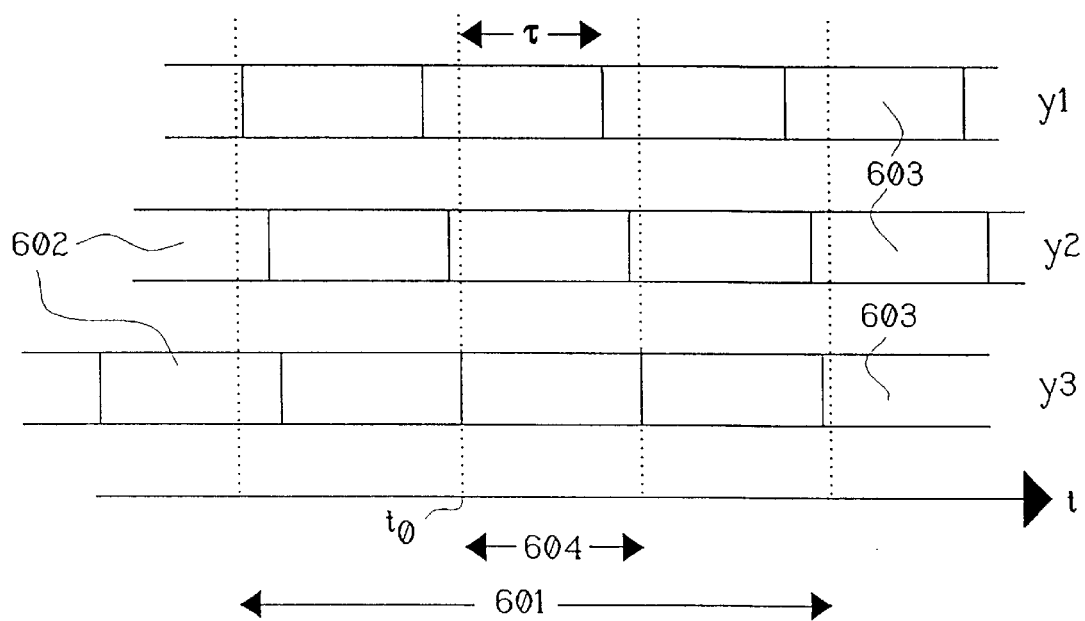
FIG. 6 shows a view of two windows with different widths in a window algorithm.

If the symbol sequences are received in a continuous stream then a window algorithm can be used for estimation and detection of the individual symbols in the symbol sequences. The window algorithm estimates a predetermined number of symbols from each received signal $y_1$, $y_2$ and $y_3$ in a so called window 601, see FIG. 6. The size of the window influences how large a part of the symbol sequences $y_1$, $y_2$ and $y_3$ the receiver detects in each time unit. The symbols 602 and 603 at the beginning of the window and its end are not detected because only parts of these symbols fall within the length of the window. It is only whole symbols in the window 6501 which are detected. The cause of errors is known as edge effect. In large windows edge effects are ignored because the number of signals which are lost because of edge effects are small compared with the total number of symbols in the window 601. However, with small windows 604 then said error becomes noticeable.

An example of a realization of a window algorithm can be a shift register which shifts one symbol forward at a time.

The present invention builds on the idea that the received symbol sequences $y_1$, $y_2$ and $y_3$ are detected in a short window, even as small as a symbol time length $t_s$. The edge effects are compensated for through overlapping and non-orthogonal parts of the symbol sequences $y_2$ and $y_3$ in the time being subtracted so that only the desired symbol sequence $y_1$ remains. In this way the energy in the symbol sequence $y_1$ is better utilized and a large part of the losses which were mentioned in connection to FIG. 2 are avoided.

Figure 7:
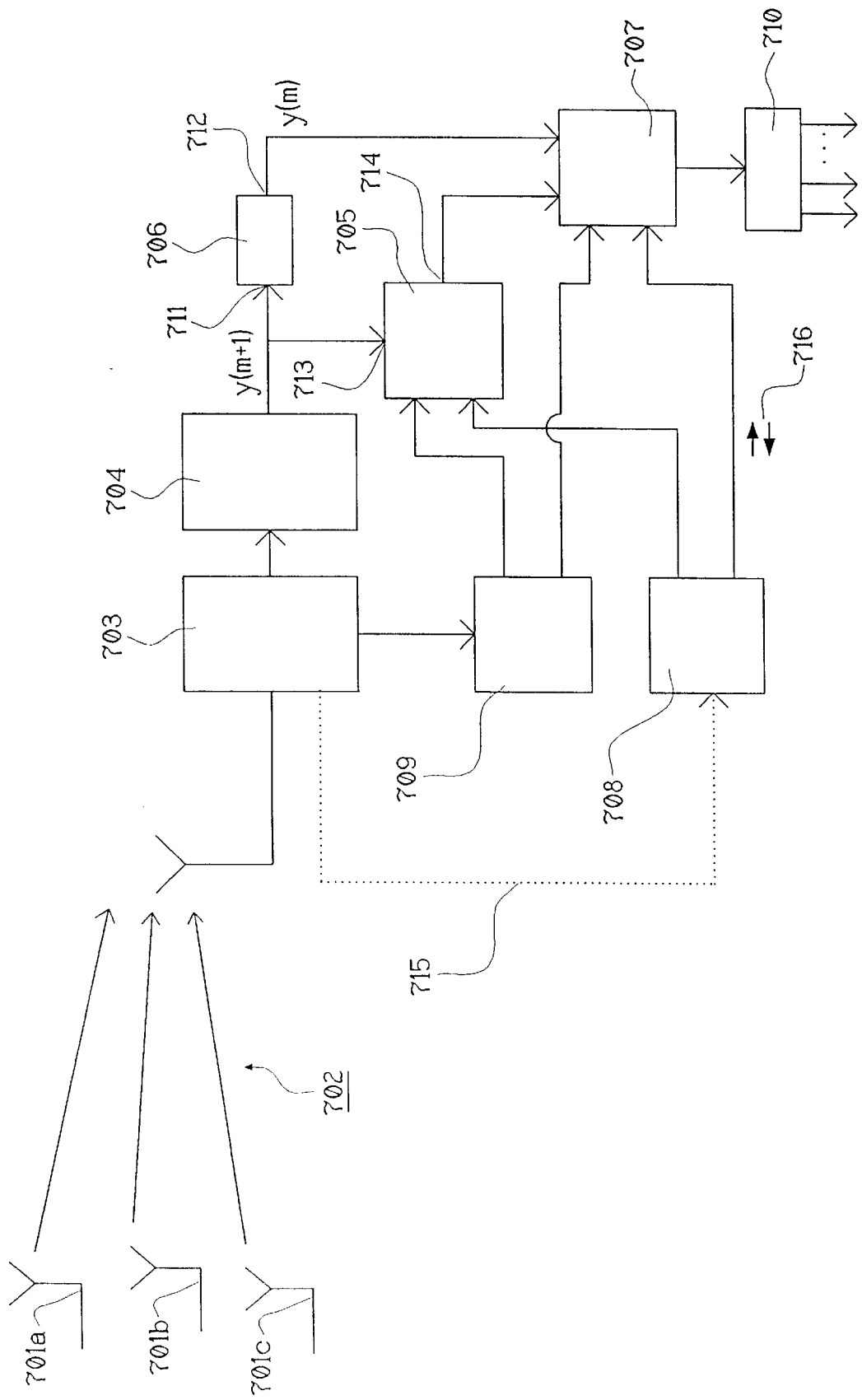
FIG. 7 shows a simple block diagram for a first preferred embodiment of the invention.

FIG. 7 shows a first embodiment of the invention for detecting symbols out of DS-CDMA signals from different users. This example shows three users 701*a*, 701*b* and 701*c*. The signals are transmitted on a common radio channel 702 without multipath propagation.

The device comprises a receiver means 703 which spreads down the received DS-CDMA signals and generates the spread down symbol sequences. The receiver means are connected to a vector generator 704 and a cross correlation generator 709. The vector generator 704 generates vectors with downspread symbols, so called symbol vectors, which contain a symbol from each downspread symbol sequence $y_1$, $y_2$ and $y_3$. The vector generator 704 is directly connected to an input 713 on an auxiliary receiver 705 and an input 711 to a delay module 706. An output 712 on the delay module 706 is connected to a main receiver 707.

The delay module 706 delays the symbol vectors by a symbol time $t_s$, which means that if the vector generator 704 generates the symbol vector y(m+1) then the main receiver 707 detects the symbol y(m). The main receiver 707 is also connected to channel estimating generator 708 which generates channel estimate matrices, cross correlation generator 709 which generates cross correlation matrices and to a component generator 710 which divides up an incoming symbol vector into individual components.

The auxiliary receiver 705 which is connected to the vector generator 704 via its input 713 is also connected to the channel estimate generator 708 and cross correlation generator 709 and via an output 714 connected to the main receiver 707.

Described in overview, the above-mentioned inventive idea is performed so that the edge effects for the symbol vectors y(m) are compensated for in the main receiver 707 partly with the help of the already detected symbol vector y(m−1) and partly with the help of the following symbol vector y(m+1), the value of which is estimated in the auxiliary receiver 705. The main receiver 707 and auxiliary receiver 705 detect the symbol vectors each in their own time windows.

Figure 8:
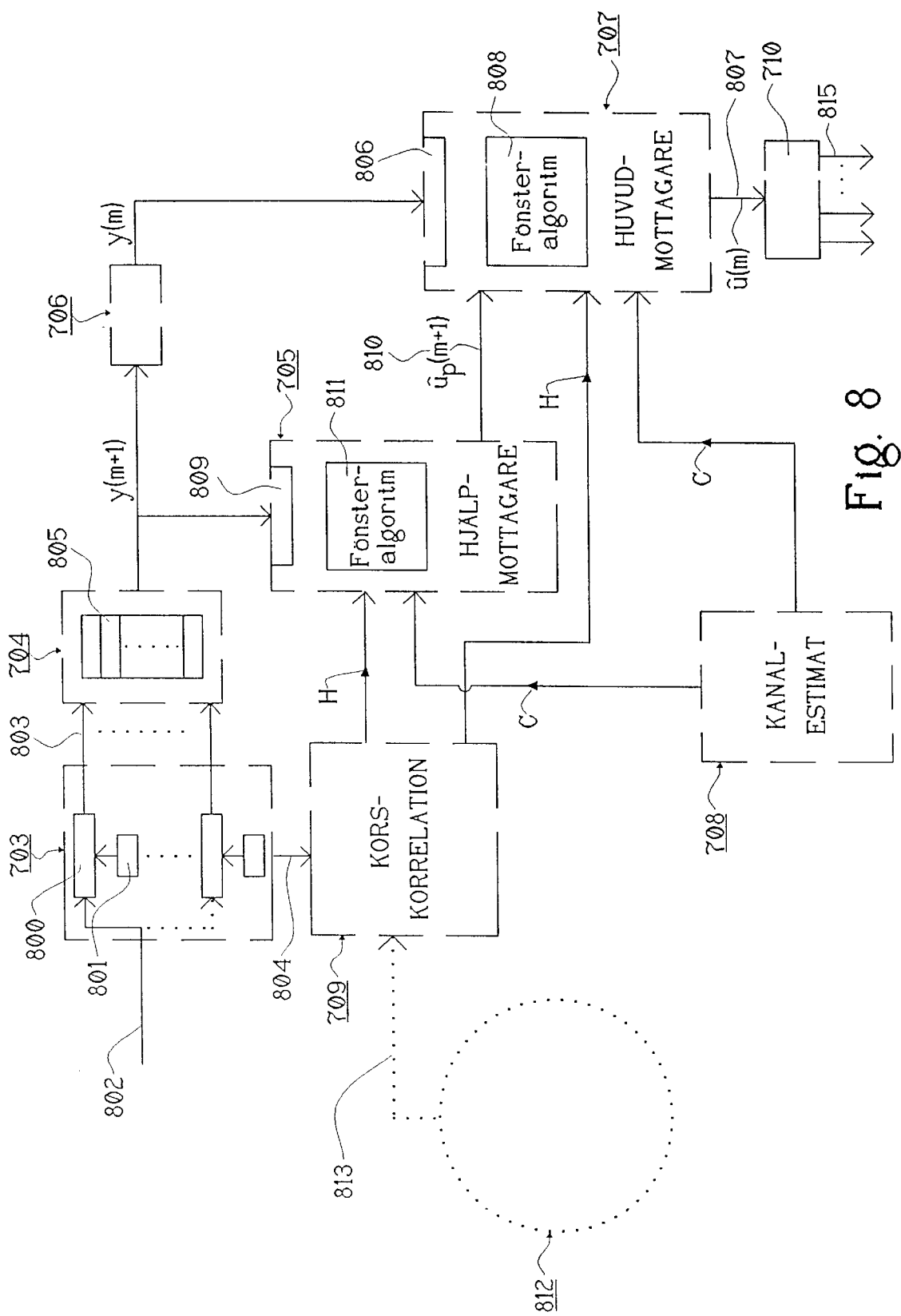
FIG. 8 shows a more detailed block diagram of a first preferred embodiment of the invention.

FIG. 8 shows in more detail how the device is constructed.

The receiver device 703 comprises correlators 800 and spreading sequence generators 801 for downspreading of the received DS-CDMA signals 802 to the downspread symbol sequences 803. The receiver means 703 also generates a value for the delay 804 between the symbol sequences 803 of the users. The main receiver 707 detects the symbol vectors 805 from the vector generator 704 via the delay module 706 in a second window 806 with the length of one symbol time $t_s$. This means that it is extremely important that the receiver corrects for edge effects. The main receiver 707 uses a device with a second window algorithm 808 in order to calculate a final estimated symbol vector 807 for the received symbol vectors 805. The following component generator 710 divides up the final estimated symbol vectors 807 into individual components 815 for each user.

Figure 9:
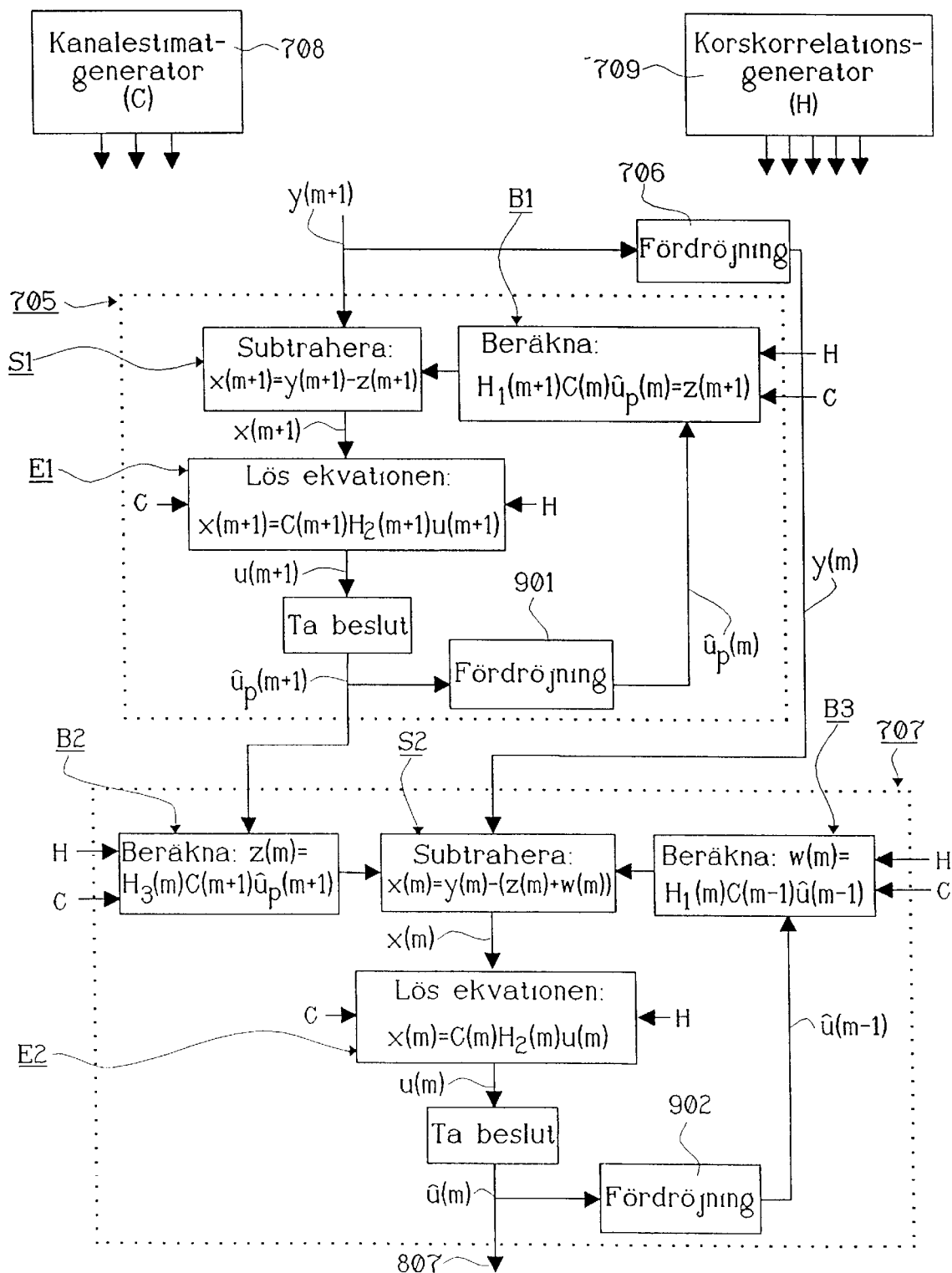
FIG. 9 shows a block diagram for a window algorithm.

The auxiliary receiver 705 detects the symbol vectors 805, in a first window 809 with a length of one symbol time $t_s$, one time unit before the symbol vectors which the main receiver 707 detects in the second window 806. This means that the auxiliary receiver 705 generates provisionally estimated symbol vectors 810 of the next coming symbol vector in the main receiver 707. When the auxiliary receiver 705 detects the symbol vector y(m+1) it generates a provisionally estimated symbol vector $\hat{u}_p(m+1)$ with the help of a device with a first window algorithm 811. The window algorithm in the auxiliary receiver 705, see FIG. 9, comprises a calculation B1, $z(m+1)=H1(m+1)C(m)\hat{u}_p(m)$, a subtraction S1, x(m+1)=y(m+1)−z(m+1), and an equation E1, $x(m+1)=C(m+1)H_2(m+1)u(m+1)$. In this connection the received symbol vector is referenced as y(m+1), a first partial signal as x(m+1) which is a result of the subtraction S1, a first correction term as z(m+1), which is a result of the calculation B1, a preceding provisionally estimated symbol vector as $\hat{u}_p(m)$, channel estimations from the channel estimation generator 708 as C(m) and C(m+1), cross correlation matrices from the cross correlation generator 709 as $H_1(m+1)$ and $H_2(m+1)$ and a first corrected symbol vector as u(m+1). The channel estimate matrix C corrects for the interference which occur in the channels between the transmitter and the receiver. The cross correlation matrices H and the preceding provisional estimated symbol vector $\hat{u}_p(m)$ are used in order to correct parts of overlaps from other users. In FIG. 9 the channel estimation matrices are referenced by C and the cross correlation matrices by H. With the help of the first corrected symbol vector u(m+1) a decision is taken on which symbols said symbol vector u(m+1) covers. This generates the provisional estimated symbol vector $\hat{u}_p(m+1)$ with a received symbol from each user.

The main receiver 707 takes account of both the preceding symbol vector y(m−1) and the next symbol vector y(m+1) when the finally estimated symbol vector $\hat{u}(m)$ of y(m) is generated. The window algorithm in the main receiver 707 uses a calculation B2, $z(m)=H_3(m)C(m+1)\hat{u}_p(m+1)$, a calculation B3, $w(m)=H_1(m)C(m-1)\hat{u}(m-1)$, a subtraction S2, x(m)=y(m)−[z(m)+w(m)] and an equation E2, $x(m)=C(m)H_2(m)u(m)$. In this connection the symbol vector received in the main receiver 707 has the reference y(m), a preceding final estimated symbol vector in the main receiver 707 is $\hat{u}(m-1)$, the provisionally estimated symbol vector from the auxiliary receiver 705 is $\hat{u}_p(m-1)$, a second correction term is z(m), which is a result of the calculation B2, a third correction term is w(m) which is a result of the calculation B3, a second partial signal is x(m) which is a result of the subtraction S2, the channel estimate from the channel estimation generator 708 is C(m), C(m+1) C (m−1), respectively and the cross correlation matrices from the cross correlation generator 709 are $H_1(m)$, $H_2(m)$ and $H_3(m)$, and a second corrected symbol vector is u(m). With help of the second corrected symbol vector u(m) a decision is taken on which symbols said symbol vector u(m) includes. This generates the final estimated symbol vector $\hat{u}(m)$ with a symbol 401 received from each user.

Each symbol is detected only once in the respective receivers which gives an effective symbol detection.

The channel estimating generator 708 can be designed in a number of ways, for example as part of program code for a digital signal processor, DSP, or as part of an ASIC. The estimation of the channel estimate is complicated and can be performed with the help of different methods. An example of such a method is to transmit a number of known symbols 401 with a separate spreading sequence 111. Starting from how the received known symbols appear and how they should appear if the channel 702 was ideal, the channel estimate can be calculated. The said method requires an extra connection 715, see FIG. 7, between the channel estimate generator 708 and the receiving means 703. Another example is to place known symbols in the other signals in a regular manner which is similar to the earlier described PSAM technique. This method means that it is not necessary to have any extra connection 715 between the channel estimating generator 708 and the receiver means 703. This, however, requires that a double directed signal between the channel estimating generator 708 and the main receiver 707 can be produced. This signaling is illustrated in the Figures with two oppositely directed arrows 716. In this embodiment the channel estimating generator 708 includes a number of functions in the receiver which calculate an estimate of the interference which the channel 702 has introduced on the symbol sequences 803 of the respective users 701a–701c. The interference is corrected in the receiver with the help of the channel estimation matrices C which comprise the values of the channel estimates which the channel estimation generator 708 generates. For a closer description of two examples of said functions and their design in a so called straight receiver reference is made to Digital Communications by John G. Proakis, published by McGrawHill, third edition, ISBN 0-07-051726-6, pages 802–804, 1995.

The cross correction generator 709 comprises a number of functions in the receiver which calculates the dependency between the received signals 802. In this case the value of the cross correlation between the spreading sequences of the received signals 802. In order to generate cross correlation matrices information is required on the time delay τ between respective user symbol sequences 803 and information on which spreading sequences 111 are used in the radio system. Information on τ 804, see FIG. 8, is taken from the receiver means 703 and information on the spreading sequences 813 used is taken from higher system levels 812 in the communication system. An estimate of τ can for example be made by spreading down a received signal with different delayed versions of the spreading sequence 111. The time delay which gives the strongest signal gives the τ which is been looked for. The cross correlation matrices H from the cross correlation generator 709) are used by the window algorithm in the devices 811 respectively 808 in order to correct for overlapping between the signals.

The component generator 710 receives the final estimated symbol vector 807 from the main receiver 707. The symbol vectors which include a symbol 401 per user are divided up into separate components 815 which include symbols from the one and the same symbol sequence 803. That is to say the symbol generator 710 generates one component 815 per user.

Figure 10:
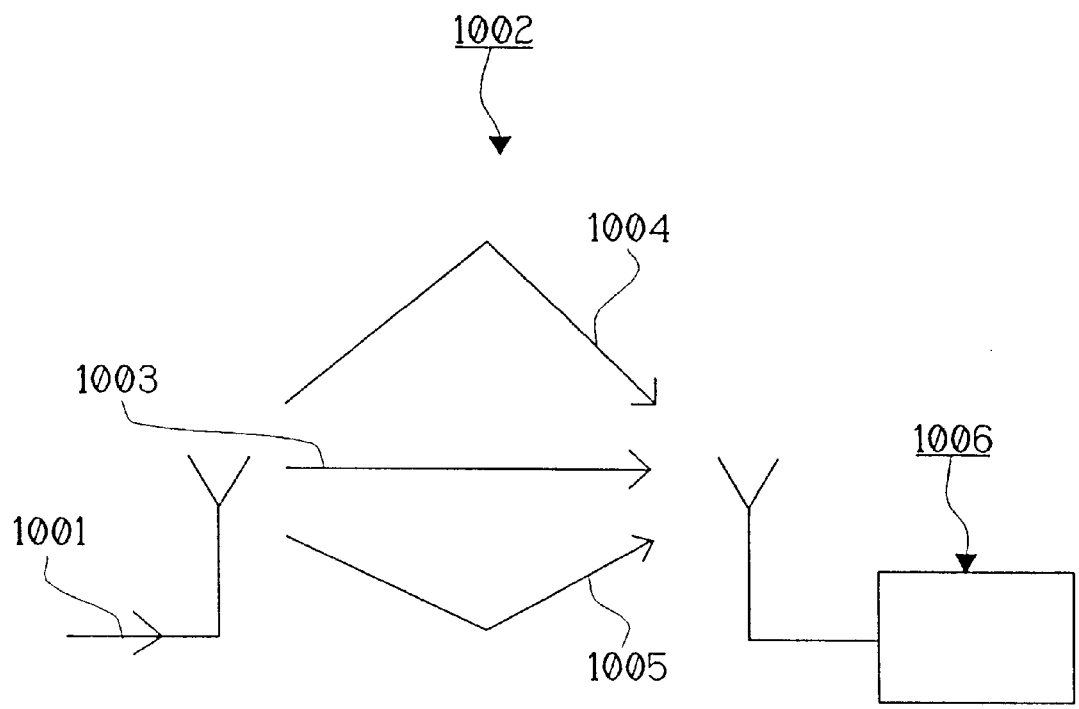
FIG. 10 shows a simple sketch for a multipath propagation between a transmitting antenna and a receiver.
Figure 11A:
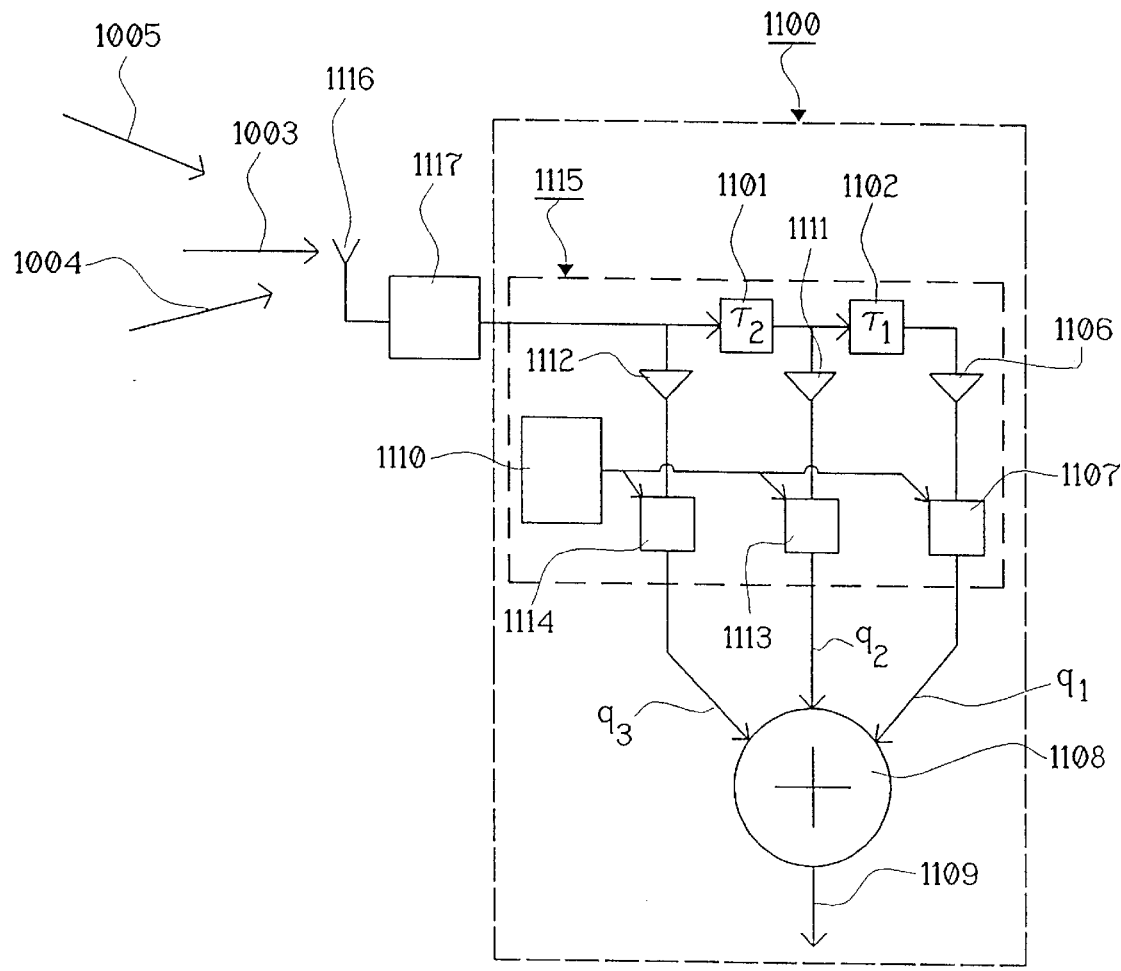
FIG. 11a shows a simple sketch of a direct receiver.

A signal from a transmitter can go different ways before it reaches a receiver. In this case the same signal is divided up into a number of beams, which is called multipath propagation. FIG. 10 shows how a signal 1001 has been divided into three beams 1002, a direct beam 1003 and two reflected beams 1004 and 1005. These beams reach the receiver 1006 with a certain mutual time displacement. A known type of receiver which can collect together the energy from several beams and take advantage of multipath propagation is a so called direct receiver. The direct receiver collects in a known way a predetermined number of beams from the one and same signal. FIG. 11a shows an example of a direct receiver 1100 for the three beams 1003, 1004 and 1005. The direct receiver 1100 is connected to an antenna 1116 via a unit 1117 with, amongst others, receiver filters. The direct receiver comprises a first delaying element 1101 and a second delaying element 1102, each having an input and output. The input on the first delaying element 1101 is connected to the unit 1117. The output on the first delaying element 1101 is connected to the input on the second delaying element 1102. Two weighing devices 1106 and 111 are connected to their own output on the delaying elements 1101 and 1102, respectively. A third weighing devices 1112 is connected to the input on the first delaying element 1101. The weighing devices 1106, 1111 and 1112 are each connected to their own correlators 1107, 1113 and 1114, respectively. The correlators are connected to a spreading sequence generator 1110 and an adder 1008. The incoming beams 1003, 1004 and 1005 reach the direct receiver 1100 with a mutual time displacement. The second beam 1004 is delayed the time τ1 in relationship to the first beam 1003. The third beam 1005 is delayed the time τ1+τ2 in relationship to the first beam 1003. The first beam 1003 passes through both delaying elements 1102 respective 1102 and is delayed the time τ1+τ2 while the second beam 1004 only passes through the first delaying element 1101 and is delayed the time τ2. The third beam 1005 does not pass through any delaying element. This means that the time delay between the beams is eliminated. Each beam is weighed in the weighing devices 1106, 1111 and 1112, respectively before the beams are spread down in the correlators 1107, 1113 respectively 1114, with the help of the spreading sequence generator 1110, to symbol sequences $q_1$, $q_2$ and $q_3$. The symbol sequences $q_1$, $q_2$ and $q_3$ are added in the adder 1008, which forms a resulting downrspread signal 1109.

Figure 11B:
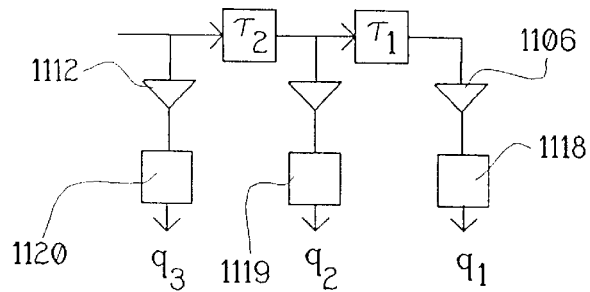
FIG. 11b shows a part of a direct receiver with a signal adapted filter.

The said correlators 1107 1113 and 1114 and the spreading sequence generator 1110 can be replaced with three signal adapted filters 1118, 1119 and 1120, see FIG. 11*b*.

Figure 12A:
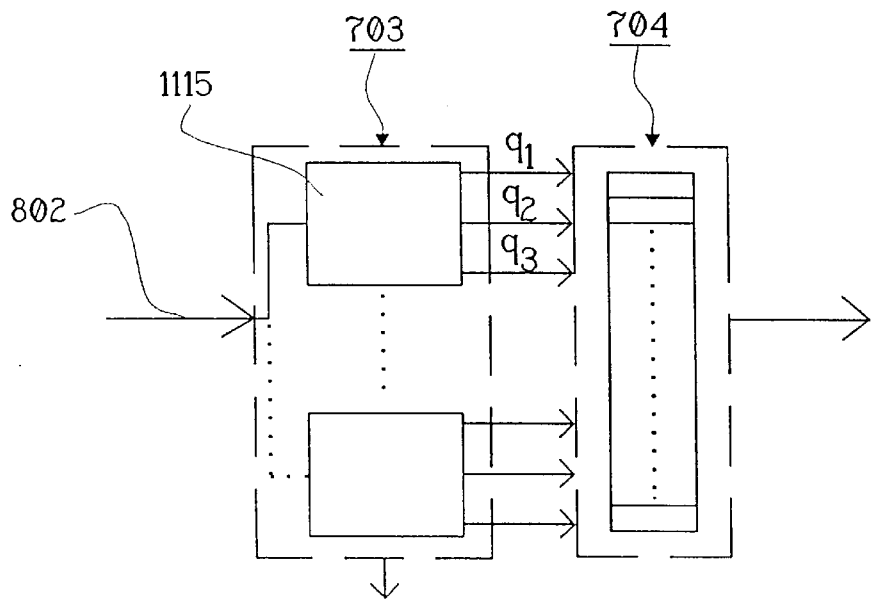
FIG. 12a shows a first part of a block diagram with details from a second embodiment of the invention.
Figure 12B:
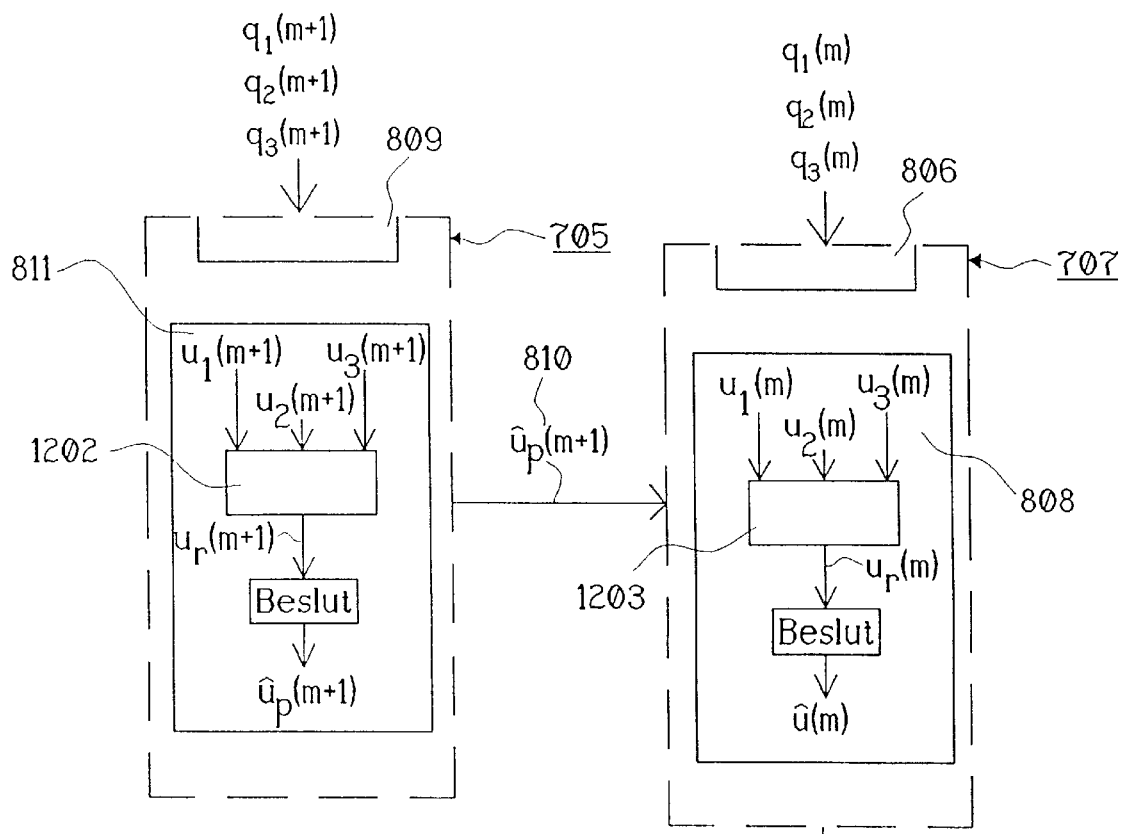
FIG. 12b shows a second part of a block diagram with further details from a second preferred embodiment of the invention.

A second preferred embodiment of the invention which can cope with multipath propagation is built upon the first preferred embodiment in connection to FIG. 8. The receiver device 703 comprises a direct receiver part 1115, see FIG. 12*a*, which includes the direct receiver 1100 without the adder 1108 for the three beams 1003, 1004 and 1005, per user. The direct receiver part 1115 generates the three symbol sequences $q_1$, $q_2$ and $q_3$ per user. The main receiver 707 in FIG. 12*b* includes a second adder 1203 for each user and the auxiliary receiver 705 includes a first adder 1202 for each user. Between the receiver arrangement 703 and the adders 1202 and 1203 the respective symbol sequences $q_1$, $q_2$ and $q_3$ from the direct receiver part 1115 are treated in accordance with the first embodiment as described in connection to FIG. 8. The first adder 1202 in the auxiliary receiver 705 sums the three first corrected symbol vectors $u_1(m+1)$, $u_2(m+1)$ and $u_3(m+1)$ from a time point m+1. These symbol vectors originate from three symbol vectors $q_1(m+1)$, $q_2(m+1)$ and $q_3(m+1)$ which the auxiliary receiver 705 detects in the first window 809. The result of the summations are a first resulting corrected symbol vector $u_r(m+1)$. With the help of said symbol vector $u_r(m+1)$ a decision is taken to generate the provisional estimate $\hat{u}_p(m+1)$ of a symbol vector in the auxiliary receiver 705 in the same way as in the first embodiment. The second adder 1203 in the main receiver sums three second corrected symbol vector $u_1(m)$, $u_2(m)$ and $u_3(m)$ from the time point m. These symbol vectors originate from three symbol vectors $q_1(m)$, $q_2(m)$ and $q_3(m)$ which the main receiver 707 detects in the second window 806. The result of the summations is a second resulting corrected symbol vector $u_r(m)$. With the help of said symbol vector $u_r(m)$ a decision is taken to generate the final estimate û(m) of a symbol vector in the main receiver 707 in the same way as in the first embodiment. Otherwise, the two said embodiments are designed in the same way.

A third preferred embodiment is based on the first preferred embodiment as described in connection to FIG. 8. The second window 806 in the main receiver 707 is of the length four symbol times $t_s$, see FIG. 13. The vector generator 704 is arranged to generate wide symbol vectors 1302 and 1303 which include four symbols $4t_s$ from each downspread symbol sequence 803. The auxiliary receiver 705 generates a provisional estimate 810 of a first symbol 1301 in the next wide symbol vector 1302 arriving at the main receiver 707. The main receiver 707 generates a final estimate 807 of all of the wide symbol vector 1303. The device with the window algorithm 808 in the main receiver 707 is adapted to the wide symbol vectors. Each symbol 401 in the symbol vector 1303 is detected once in the receiver 707. For the rest the first preferred embodiment corresponds with the third preferred embodiment.

Even other lengths for the second window 806 can be conceived, whereby the number of signals from each symbol sequence 803 in the symbol vectors 805 are adapted to the length of the second window 806.

The third suggested embodiment can also be combined with the second embodiment. In this case the device is adapted to cope with multipath propagation and to work with wide symbol vectors 1302 and 1303.

A fourth embodiment of the invention is based upon the first embodiment of the invention. In the fourth embodiment the auxiliary receiver 705 includes a first auxiliary unit 1401 and a second auxiliary unit 1402, see FIG. 14. The delay module 706 includes a first delay unit 1403 and a second delay unit 1404. The two delay units 1403 and 1404 delay a symbol vector 805 each by a symbol time $t_s$ per unit. The input 711 on the delay module 706 is connected to the first delay unit 1403 which in turn is connected via an output 1405 to an input 1406 on the second delay unit 1404. The output 1405 from the first delay unit 1403 is also connected to the second auxiliary unit 1402 in the auxiliary receiver 705. An output 1407 from the second delay unit 1404 is connected to the output of the delay module 706. The first auxiliary unit 1401 is connected to the input 713 on the auxiliary receiver 705 and to the second auxiliary unit 1402 which in turn is connected to the output 714 on the auxiliary receiver 705. Both the first auxiliary unit 1401 and the second auxiliary unit 1402 are connected to the channel estimating generator 708 and the cross correlation generator 709. When the auxiliary receiver 705 detects a symbol vector y(m+2) then the first auxiliary unit 1401 generates a first provisional estimate $\hat{u}_{p1}(m+2)$ of the symbol vector y(m+2) with the help of an earlier first provisionally estimated symbol vector $\hat{u}_{p1}(m+1)$ in the first auxiliary unit 1401, channel estimate matrices C from the channel estimating generator 708 and cross correlation matrices H from the cross correlation generator 709. This has been described in detail in connection to FIG. 8. The second auxiliary unit 1402 detects a symbol vector y(m+1) delayed in the first delay unit 1403, in a third window 1408 with the length of one symbol time $t_s$. The second auxiliary unit 1402 generates a second provisional estimate $\hat{u}_{p2}(m+1)$ of the symbol vector y(m+1) with the help of an earlier second provisional estimated symbol vector $\hat{u}_{p2}(m)$ in the second auxiliary unit 1402, the first provisional estimate $\hat{u}_{p1}(m+2)$ of a symbol vector y(m+2) from the first auxiliary unit 1401, the channel estimate matrices C from the channel estimating generator 708 and the cross correlation matrices H from the cross correlation generator 709. This has also been described in detail in connection to FIG. 8.

The first auxiliary unit 1401 uses a device with a window algorithm 1409 in the same way as the auxiliary receiver 705 in the first embodiment. The second auxiliary unit 1402 uses a device with a window algorithm 1410 in the same way as the main receiver 707 in the first embodiment. The second provisional estimate $û_{p2}(m+1)$ of a symbol vector $y(m+1)$ corresponds to the provisional estimated symbol vector $û_p(m+1)$ of the main receiver 707 in the first embodiment. The main receiver 707 generates the final estimated symbol vector $û(m)$ as described in the first embodiment. For the rest the first preferred embodiment corresponds with the fourth preferred embodiment.

The said devices, generators, modules and units in the said embodiments can be designed equally as hardware or software or as a combination of these.

The main receiver 707 and auxiliary receiver 705 in said preferred embodiments can be of different types and variations, which are exemplified below.

A receiver which treats the downspread symbol sequences 803 parally in the receiver is called a joint detection receiver.

A receiver which uses a linear transformation, for example multiplication with matrices, during treatment of the received symbols 401 is called a linear receiver. A linear receiver which uses matrices which are optimized to diminish interference without knowledge of the size of the noise are called linear decorrelated receivers. A linear receiver which uses an estimated value of the noise during treatment of a received symbol 401 is called an MMSE-receiver (Minimum Mean Squared Error receiver), that is to say a receiver which uses the minimum mean square error method.

A receiver can use coherent or non-coherent detection. A coherent receiver must know the phase position of the received carrier wave while a non-coherent receiver does not need to know said phase position.

A receiver which during detection of the received symbols 401 chooses the most likely symbols is called a maximum likelihood receiver.

The main receiver 707 and auxiliary receiver 705 in said preferred embodiments can be of linear receiver type, coherent receiver type, maximum likelihood receiver type, MMSE-receiver type, linear decorrelated receiver type, joint detection receiver type and decorrelated receiver type and different combinations of these.

Figure 15:
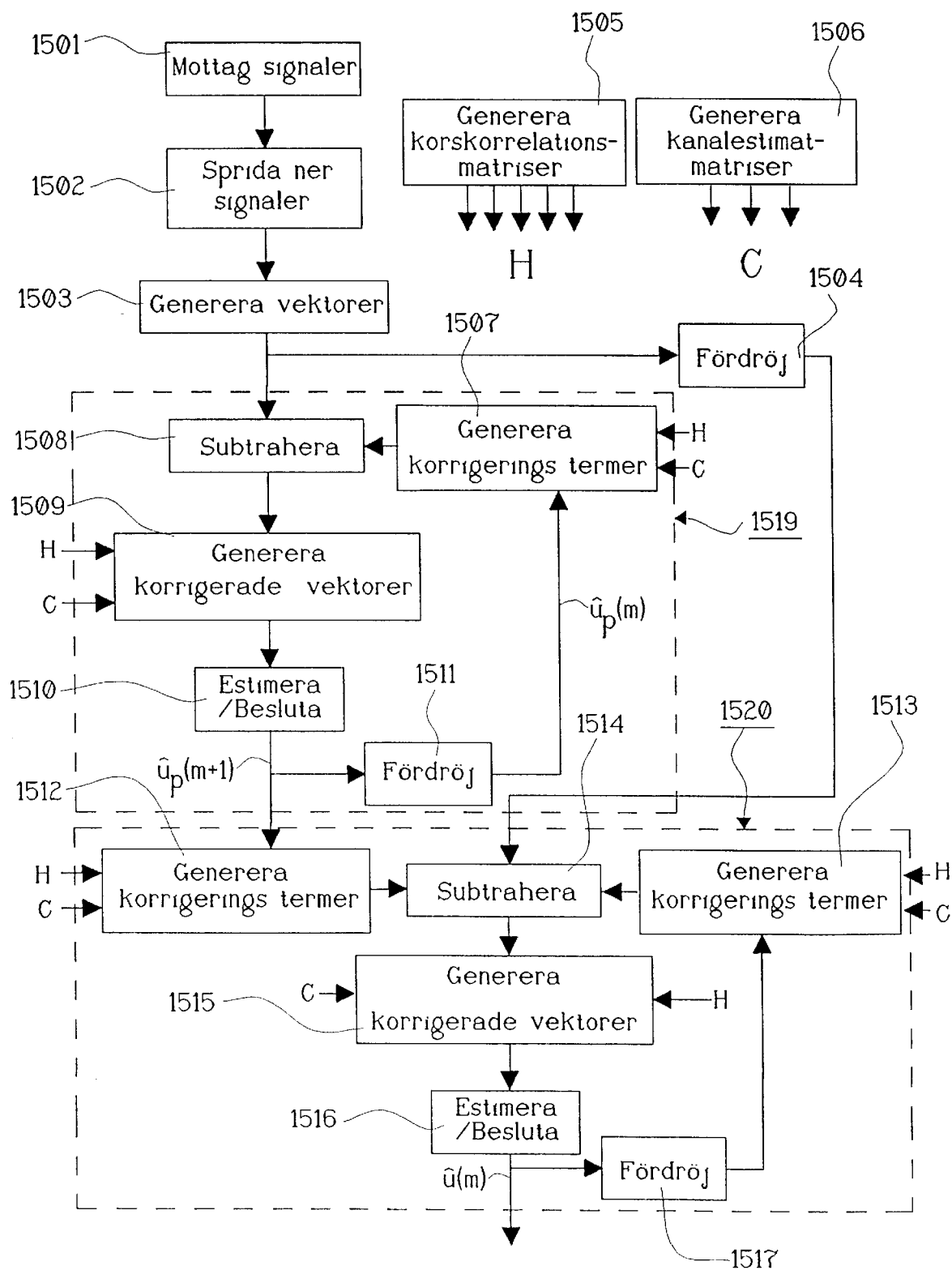
FIG. 15 shows a flow diagram for a method.

A method in accordance with the invention, which is performed in the device in FIG. 7 is shown in a flow diagram in FIG. 15. In FIG. 15 the cross correlation matrices have the reference H and the channel estimating matrices the reference C. In a block 1501 the DS-CDMA signals are received. The received signals are spread down in a block 1502 to the symbol sequences 803. A following block 1503 generates symbol vectors 805 which include a predetermined number of symbols from each symbol sequence 803. A block 1504 delays the symbol vectors in a first delay stage 706 before they reach a block 1514. In a block 1505 the cross correlation matrices H are generated and in a block 1506 the channel estimate matrices C are generated. The meaning of the cross correlation matrices H and channel estimation matrices C have been explained earlier in connection with the first embodiment, see FIG. 8. In a block 1507 the first correction terms $z(m+1)$ are generated with the help of on the one hand the preceding provisional estimated symbol vectors $û_p(m)$ from a block 1511 and on the other hand the cross correlation matrices H and channel estimation matrices C belonging to said block 1507. The first correction terms from block 1507 are subtracted in a first subtraction, in a block 150:8, from the generated symbol vectors in block 1503. The first subtraction generates the first partial signals $x(m+1)$. In a subsequent block 1509 the first corrected symbol vectors $u(m+1)$ are generated with the help of on the one hand the first partial signals $x(m+1)$ from the first subtractions in block 1508 and on the other hand the cross correlation matrices H and channel estimation matrices C belonging to said block 1509. The provisional estimation of the symbols in the first corrected symbol vectors $û(m+1)$ is performed in a block 1510 which generates the provisional estimated symbol vectors $û_p(m+1)$. In the subsequent block 1511 the estimated symbol vectors are delayed before they reach the block 1507 with the help of a second delay stage 901.

Second correction terms $z(m)$ generated in a block 1512 with the help of the one hand the provisionally estimated symbol vectors $û_p(m+1)$ from block 1510 and on the other hand the cross correlation matrices H and channel estimates C belonging to said block 1512. In a block 1513 the third correction terms $w(m)$ are generated with the help of on the one hand the preceding final estimated symbol vectors $û(m-1)$ from one block 1517 and on the other hand the cross correlation matrices H and channel estimate matrices C belonging to said block 1513. In block 1514 the second and third correction terms are subtracted from the signal vectors from the block 1504 in a second subtraction. The second corrected symbol vectors $u(m)$ generated in the following block 1515 with the help of on the one hand the cross correlation matrices H and channel estimation matrices C belonging to said block 1515 and, on the other hand, the second partial signals $x(m)$ from the previous second subtraction in block 1514. In a block 1516 a final estimation of the symbols in the second corrected symbol vectors $û(m)$ from block 1515 is performed, which generate the final estimated symbol vectors $û(m)$. The said final estimated symbol vectors $û(m)$ are delayed in block 1517 with the help of a third delay stage 902 before they reach block 1513.

The method uses i.a. the earlier estimated symbol vectors $û_p(m)$ and $û(m-1)$. This means that the first estimated symbol vectors in the receiver, at the start, are estimated without any knowledge of earlier preceding estimated symbol vectors. In order to achieve a good quality on the first symbol vectors estimated after the start a number of known symbols can be used at the start. These known symbols are sent in a known way from the users when they begin to transmit. The receiver compares these first symbols that are received with copies of them in a known way. This means that the following symbols can be estimated with a good accuracy.

Figure 14:
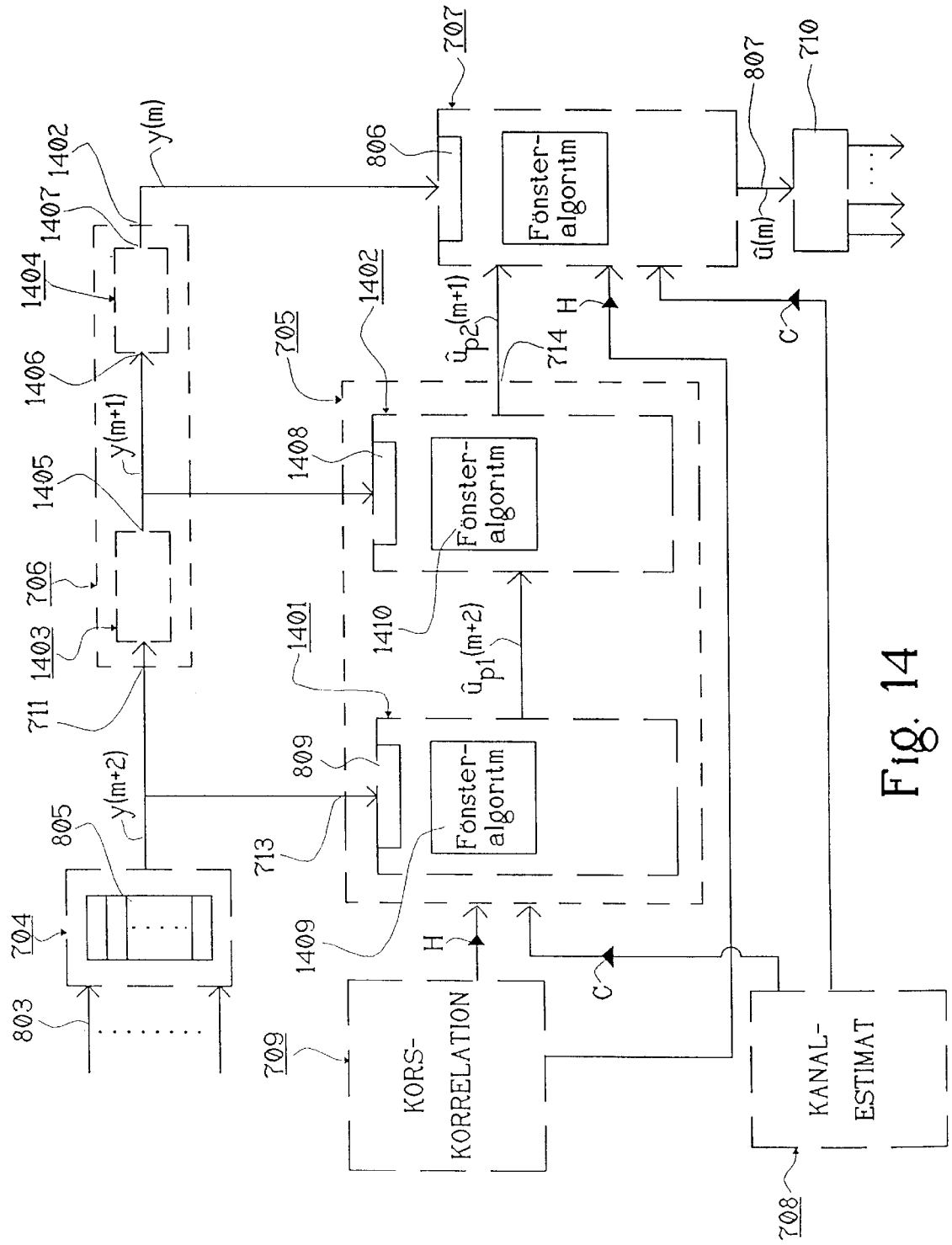
FIG. 14 shows a block diagram with details from a fourth preferred embodiment of the invention.

The said method can also be performed in the device of FIG. 14. In said Figure the auxiliary receiver 705 includes, on the one hand, the first auxiliary unit 1401 and, on the other hand, the second auxiliary unit 1402. The delaying module 706 includes the first delay unit 1403 and the second delay unit 1404. In the method is the first preliminary estimation $û_{p1}(m+2)$ of the symbol vector $y(m+2)$ is performed and then the second preliminary estimation $û_{p2}(m+1)$ of the symbol vector $y(m+1)$, before the main receiver 707 performs the final estimation $û(m)$ of the symbol vector $y(m)$.

Figure 13:
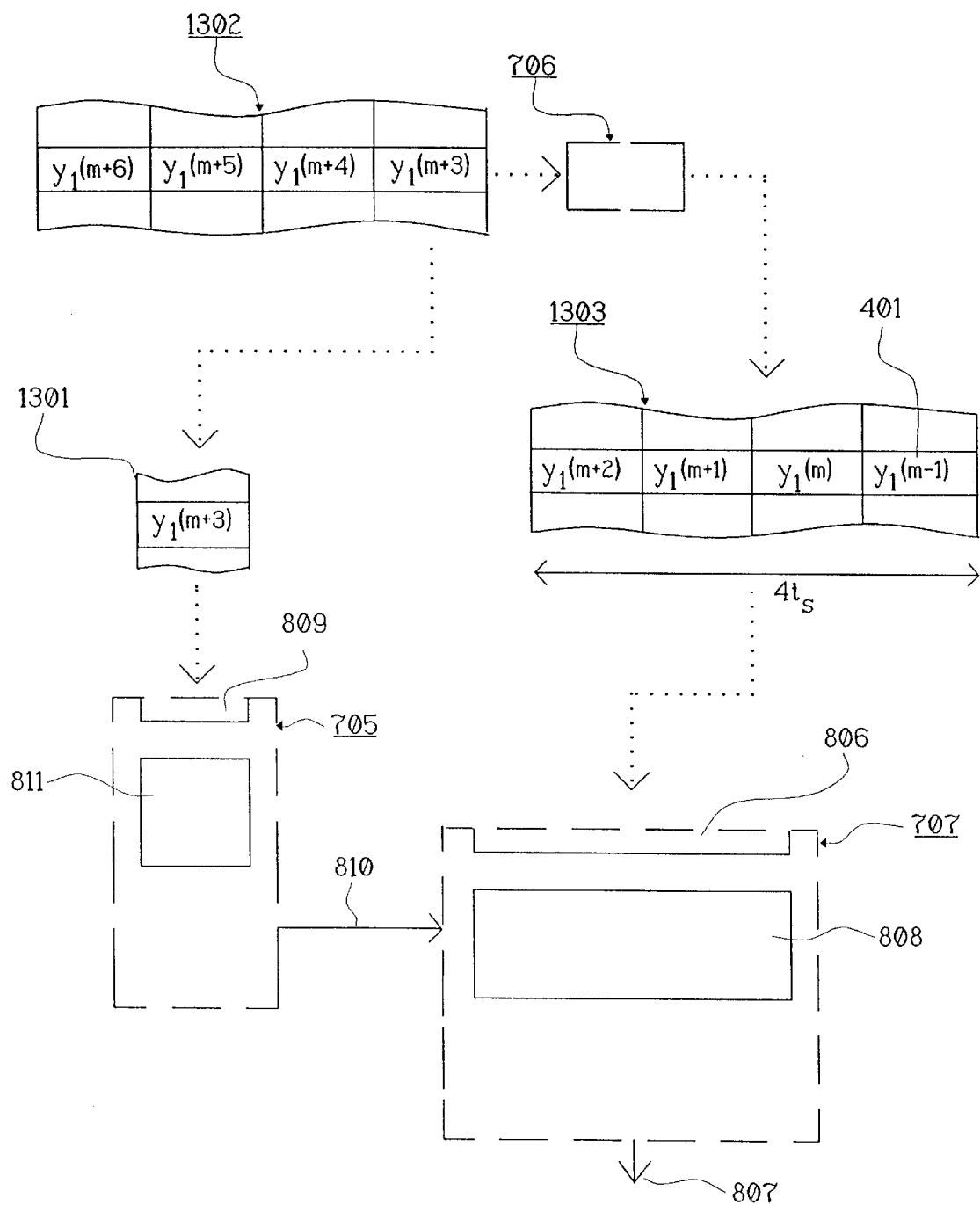
FIG. 13 shows a block diagram with details from a third preferred embodiment of the invention.

The first said embodiment can also be performed in the device in connection to FIG. 13. In said device the main receiver 707 performs a final estimation 1520 of four symbols 4ts at a time. The auxiliary receiver 705 performs a provisional estimation 1519 on the first symbol 1301 of the next four symbols 1302 arriving at the main receiver 707.

We claim:

1. A method for finally estimating symbols in a radio system with band spreading, wherein the transmitted radio signals from at least one user are downspread with spreading sequences and signals transmitted on a common frequency band, which radio system includes a main receiver and an auxiliary receiver, which read the signals in time windows of predetermined lengths, and wherein the time window of the auxiliary receiver lies in front of the time window of the main receiver in time, and wherein the method includes the following steps:

receiving of the signals which are transmitted over a channel;

downspreading of the received signals to symbol sequences by means of sequences corresponding to the spreading sequences;

delaying of a predetermined number of symbols from each symbol sequence in a first delay step;

generation of the value of cross correlations between the spreading sequences of the received signals;

generation of the value of a channel estimate for the received signals, which channel estimation is an estimate of the transmission characteristics of the channel;

provisional estimation of the symbols in the auxiliary receiver with the help of the values of the cross correlation and channel estimate and previous provisional estimated symbols, whereby the auxiliary receiver generates provisionally estimated symbols;

final estimation of symbols in the main receiver with the help of the value of the cross correlation and channel estimates, the provisionally estimated symbols from the auxiliary receiver and previous final estimated symbols from the main receiver, which generates the final estimated symbols.

2. Method according to claim 1, in which the provisional estimate in the auxiliary receiver includes the following steps:

generation of first correction terms, with the help of the previous provisional symbols estimated in the auxiliary receiver and their corresponding values of the cross correlation and channel estimation;

first subtraction of the first correction terms from the number of predetermined symbols from each symbol sequence, which generates a first partial signal in the provisional estimate;

generation of first corrected symbols from the number of predetermined signals from each symbol sequence with the help of the values of the cross correlation and channel estimate corresponding to the first partial signal;

provisional estimating of the first corrected symbols from the number of predetermined symbols from each symbol sequence through deciding the value of the respective symbols, which generate said provisionally estimated symbols;

delaying of the provisionally estimated symbols in a second delay stage in order in a following step to be used for the generation of the said first correcting terms.

3. Method according to claim 2, in which the final estimation in the main receiver includes the following steps:

generation of second correction terms, with the help of the provisionally estimated symbols from the auxiliary receiver and the values of the cross correlation and channel estimations belonging to the provisionally estimated symbols;

generation of third correction terms with the help of the previous finally estimated symbols from the main receiver and the values of the cross correlation and channel estimates belonging to the previous finally estimated symbols;

second subtraction of the second and third correction terms from the number of predetermined symbols from each symbol sequence, which are delayed in said first delay stage, whereby a second partial signal in the final estimation is generated;

generation of second correction symbols from the number of predetermined symbols from each symbol sequence with the help of the values of the cross correlation and channel estimate corresponding to the second partial signal;

final estimation of the second corrected symbol from the number of predetermined symbols from each symbol sequence through deciding the value of respective symbols, which generate said final estimated symbols;

delaying the final estimated symbols in a third delaying stage in order in a subsequent step to be used for the generation of said third corrections terms.

4. Method according to claim 1, which also includes the following steps: generation of symbol vectors with the number of predetermined symbols from each symbol sequence, which form a symbol vector.

5. Method according to claim 1, in which the number of predetermined symbols from each symbol sequence numbers one symbol.

6. Method according to claim 1, in which the number of predetermined symbols from each symbol sequence numbers four symbols, whereby the main receiver performs the final estimation on four symbols in the main receiver and the auxiliary receiver performs the provisional estimation on a first symbol of the four next arriving symbols.

7. A device for finally estimating symbols in a radio system with band spreading, whereby the transmitted radio signals from at least one user are upspread with spreading sequences and signals transmitted on a common frequency band, which device includes:

a receiving device with correlators and spreading sequence generators for the downspreading of the signals with the help of a spreading sequence corresponding to the upspreading, wherein the receiver device is arranged to generate a predetermined number of downspread symbol sequences from each user on a channel;

a delaying module connected to the receiver device, where the module is arranged to delay a predetermined number of symbols from each symbol sequence for a predetermined time period;

a main receiver connected to the delay module and arranged to detect the predetermined number of symbols in a second window with a predetermined length;

an auxiliary receiver connected to the receiver device and arranged to detect the predetermined number of symbols in at least one first window having a predetermined length, which first window precedes the second window;

a cross correlation generator connected to the receiver device and arranged to generate cross correlation matrices corresponding to the downspread symbol sequences, wherein the cross correlation matrices include on the one hand the spreading sequences, on the other hand a time delay which occurs between the respective signals of the users;

a channel estimating generator arranged to generate channel estimation matrices for the channel;

whereby the auxiliary receiver is connected to the cross correlation generator and the channel estimation generator and is arranged to detect the predetermined number of symbols in at least the first window and the auxiliary receiver also is arranged to generate a provisional estimate of the predetermined number of symbols which lie before the second window with the help of the cross correlation matrices, channel estimation matrices and provisional estimate previously generated in the auxiliary receiver, of the predetermined number of symbols; and whereby the main receiver is connected to the cross correlation generator, channel estimation generator and auxiliary receiver and is arranged to generate a final estimate of the predetermined number of symbols with the help of the cross correlation matrices, channel estimation matrices, a final estimate previously generated in the main receiver, and the provisional estimate generated in the auxiliary receiver.

8. Device according to claim 7, in which the channel estimation generator is connected to the receiver device.

9. Device according to claim 7, in which the respective receiver also includes a device with a window algorithm with a time window displaceable in time in order to detect the predetermined number of symbols from each symbol sequence.

10. Device according to claim 7, in which a component generator is connected to the main receiver, wherein the component generator is arranged to generate single sequences of symbols for each user of the final estimate of the predetermined number of symbols from each symbol sequence from the main receiver.

11. Device according to claim 7, in which the predetermined length of both the second window in the main receiver and the first window in the auxiliary receiver are as equally long as a symbol time, where the predetermined number of symbols from each symbol sequence are equal to a symbol, wherein the delaying module is arranged to delay the incoming predetermined number of symbols from each symbol sequence by a symbol time.

12. Device according to claim 7, in which the predetermined length for the second window in the main receiver is as equally long as a previously determined number of symbol times, wherein the predetermined number of symbols from each symbol sequence are as equally many as the predetermined number of symbols, and the auxiliary receiver is arranged to detect a first symbol from the next arriving predetermined number of symbols from each symbol sequence in the first window, and wherein the delaying module is arranged to delay the incoming predetermined number of symbols from each symbol sequence said predetermined number of symbol times.

13. Device according to claim 7, in which the device includes a direct receiver per user, wherein the receiver device includes at least one direct receiver part which is arranged to generate at least two symbol sequences from at least one user signal, where said signal includes at least two beams with a mutual time displacement, and wherein the auxiliary receiver includes an adder per user, which is arranged to generate a first resulting predetermined number of symbols from each symbol sequence with the help of which the auxiliary receiver generates the provisional estimates of the predetermined number of symbols, and wherein the main receiver includes an adder per user which are arranged to generate a second resulting predetermined number of symbols from each symbol sequence with the help of which the main receiver generates the final estimates of the predetermined number of symbols from each symbol sequence.

14. Device according to claim 7, wherein the auxiliary receiver includes a first auxiliary unit and a thereto connected second auxiliary unit, delaying module includes a first delaying unit and a thereto connected second delaying unit, where each delaying unit has the delay of one symbol time, wherein the first delaying unit also is connected to the second auxiliary unit, the first auxiliary unit is arranged to generate a first provisional estimate of the predetermined number of symbols, corresponding to said provisional estimate with the help of the incoming predetermined number of symbols from each symbol sequence, the cross correlation matrices, the channel estimation matrices and the previously generated in the first auxiliary unit provisional estimates of the predetermined number of symbols, the second auxiliary unit is arranged to generate a second provisional estimate of the predetermined number of symbols with the help of the first provisional estimates, the in the first delaying unit delayed predetermined number of symbols from each symbol sequence, the cross correlation matrices, the channel estimation matrices and the previously, in the second auxiliary unit generated provisional estimate of the predetermined number of symbols, whereby the main receiver is arranged to generate said final estimates with the help of the second provisional estimate from the second auxiliary unit, the in the first delaying unit and in the second delaying unit delayed symbols from each symbol sequence, cross correlation matrices, channel estimation matrices and final estimate of the predetermined number of symbols previously estimated in the main receiver.

15. Device according to claim 7, wherein the device also includes a vector generator, with one input connected to the receiver device and one output connected to the delaying module and auxiliary receiver, wherein the vector generator is arranged to generate symbol vectors at predetermined points of time with a predetermined number of symbols from the symbol sequences where the number of predetermined symbols from each symbol sequence form a symbol vector.

16. Device according to claim 15, wherein the vector generator is arranged to generate symbol vectors which include a time portion of the downspread symbol sequences corresponding to the length of the second window.

17. Device according to claim 15, wherein the vector generator is arranged to generate symbol vectors which include a symbol from each and all of the downspread symbol sequences.

18. Device according to claim 7, in which the main receiver and auxiliary receiver are linear receivers.

19. Device according to claim 7, in which the main receiver and auxiliary receiver are a linear decorrelated receiver.

20. Device according to claim 7, in which the main receiver and auxiliary receiver are receivers which use the minimum squared method during receiving.

21. Device according to claim 7, in which the main receiver and auxiliary receiver are linear receivers which use the minimal squared method during receiving.

22. Device according to claim 7, in which the main receiver and auxiliary receiver are receivers which use the maximum likelihood method during receiving.

* * * * *